United States Patent
Kinoshita (10) Patent No.: US 7,363,794 B2
(45) Date of Patent: Apr. 29, 2008

(54) BEARING STRUCTURE AND PRESS MOLDING APPARATUS HAVING THE STRUCTURE

(75) Inventor: Tadatoshi Kinoshita, Tokyo (JP)

(73) Assignee: Yourbusiness Co., Ltd., Tokyo (JP)

( * ) Notice: Subject to any disclaimer, the term of this patent is extended or adjusted under 35 U.S.C. 154(b) by 0 days.

(21) Appl. No.: 11/528,238

(22) Filed: Sep. 28, 2006

(65) Prior Publication Data
US 2007/0240483 A1 Oct. 18, 2007

(30) Foreign Application Priority Data
Apr. 17, 2006 (JP) ............... 2006-113237

(51) Int. Cl.
*F16C 33/04* (2006.01)
*B21D 5/04* (2006.01)

(52) U.S. Cl. ............... 72/312; 72/387; 72/452.9; 384/313; 384/316; 384/276

(58) Field of Classification Search ............... 72/452.8, 72/452.9; 308/122, 124, 131; 384/98, 116, 384/313, 276
See application file for complete search history.

(56) References Cited

U.S. PATENT DOCUMENTS

| | | | | |
|---|---|---|---|---|
| 3,610,712 A | * | 10/1971 | Endress | 384/287 |
| 3,687,510 A | * | 8/1972 | Cooper | 384/311 |
| 4,889,435 A | * | 12/1989 | Gojon | 384/276 |
| 5,372,430 A | * | 12/1994 | Orndorff et al. | 384/116 |
| 6,230,536 B1 | * | 5/2001 | Matsuoka | 72/313 |
| 6,519,995 B2 | * | 2/2003 | Matsuoka | 72/312 |
| 6,966,700 B2 | * | 11/2005 | Weissbacher | 384/313 |
| 7,243,524 B2 | * | 7/2007 | Kinoshita | 72/452.9 |

FOREIGN PATENT DOCUMENTS

JP 2005-249019 9/2005

* cited by examiner

*Primary Examiner*—David B Jones
(74) *Attorney, Agent, or Firm*—Wenderoth, Lind & Ponack, L.L.P.

(57) ABSTRACT

While a rotational die and a predetermined position of a lower mold in which the rotational die is provided can be set in a zero contact manner, operation of setting the rotational die in the predetermined position of the lower mold can be easily performed, and occurrence of problems such as insufficient rotation of the rotational die and breakage of support shafts is reduced. To realize this, in a structure of bearing for rotatably supporting, in a bearing hole, a pivot support shaft of a rotational die arranged in a press molding apparatus, an inner diameter of at least an upper side of the bearing hole with respect to a horizontal line passing through a center of the bearing hole is formed slightly larger than a diameter of the support shaft, and a space is provided between the pivot support shaft and the inner surface of the upper side of the bearing hole.

4 Claims, 6 Drawing Sheets

Fig. 8

BEARING STRUCTURE AND PRESS MOLDING APPARATUS HAVING THE STRUCTURE

BACKGROUND OF THE INVENTION

1. Field of the Invention

The present prevention relates to an apparatus for molding a member used for a front fender or the like of an automobile by pressing, and particularly relates to a structure of a bearing for pivoting a support shaft of a rotational die (swing die) used for a negative-angle molding mechanism or the like in pressing, and a press molding apparatus having the bearing structure.

2. Related Art

As this type of apparatus in the related art, a rotation body bearing is known, the bearing is divided into a fitting base member and a covering member so that the bearing hole is divided into semicircular portions, and the fitting base member is fastened on a press apparatus body, a support shaft of the rotation body is placed on the base member to be held with the covering member, and a fastening bolt hole is formed in a direction perpendicular to the bearing hole (refer to JP-A-2005-249019).

This type of apparatus in the related art is generally configured such that support shafts are provided in the left and right sides of a rotational die for supporting the rotational die during rotation, and the support shafts are rotatably supported in bearing holes formed in the bearing.

Since tolerance between the support shaft and the bearing hole formed in the bearing also affects accuracy of products manufactured by pressing, a structure formed with dimensional accuracy of approximately $1/100$ mm has been typically used.

In this way, the rotational die used for pressing is formed with high dimensional accuracy of about $1/100$ mm in tolerance between the support shaft and the bearing hole, and the rotational die is configured to have a zero contact condition with a predetermined position in a lower mold in which the rotational die is provided in order to prevent displacement of the die during pressing, or excessive application of pressure (load) to the support shafts at a pressing position.

However, while such a technique in the related art is required to have high dimensional accuracy for forming the support shaft and the bearing hole, and in addition, is required to configure the lower mold and the rotational die provided in the lower mold to be in the zero contact condition, it is hard particularly from a difficulty in working accuracy of the bearing (bearing hole formation position) that the rotational die is arranged in the lower mold while keeping such two kinds of accuracy.

That is, when the support shafts provided in the left and right sides of the rotational die are set in the bearing holes of the bearing provided in the lower mold, if deviation occurs in dimension even in a slight level in one of a position of attaching the support shaft and a position of forming the bearing hole of the bearing, the following problems may occur.

For example, when accuracy of the support shafts provided in the left and right sides of the rotational die is supposed to be constant, the problems include:

A) In the case that the position where the bearing hole was formed is displaced in a upward with respect to the position where the support shaft is provided, a space is produced between the rotational die and the predetermined position in the lower mold where the rotational die is to be provided. Therefore, pressure during pressing is applied to the support shaft, and the pressure becomes an excessive load on the support shaft, leading to one of the problems, for example, breakage of the support shaft; and B) In the case that the position where the bearing hole was formed is displaced downward with respect to the position where the support shaft is provided, when the rotational die and the predetermined position in the lower mold where the rotational die is to be provided are set in the zero contact manner, the position where the support shaft is provided is high (above) with respect to the position where the bearing hole was formed. Therefore, the rotational die is difficult to set in the predetermined position in the lower mold, and even if it can be set, an upper side of the bearing hole strongly presses the support shaft, thereby causing a problem that the rotational die does not work (insufficient rotation of the rotational die) or the like.

In a word, the technique in the related art has the following problem: since tolerance between the support shaft and the bearing hole is made in the high dimensional accuracy of about $1/100$ mm, and work surfaces are contacted with such accuracy, it is obvious that manufacturing accuracy of the support shaft and the bearing hole is difficult to maintain. In addition, assembly of the support shaft and the bearing hole (operation of setting the rotational die in the predetermined position in the lower mold) formed with such high accuracy becomes more difficult. Consequently, much time is required for the assembly, and problems such as insufficient rotation of the rotational die and breakage of the support shaft may occur after assembling.

SUMMARY OF THE INVENTION

In an embodiment of the invention, in a bearing structure of a support shaft of a rotational die and press molding apparatus having such structure, while the rotational die and a predetermined position in the lower mold in which the rotational die is provided can be set in a zero contact manner, the operation of setting the rotational die in the predetermined position in the lower mold can be easily performed, and occurrence of problems such as insufficient rotation of the rotational die and breakage of the support shaft is reduced.

The bearing structure according to the embodiment of the invention is a structure of a bearing for rotatably supporting a pivot support shaft of a rotational die arranged in a press molding apparatus in a bearing hole, which is configured in a way that an inner diameter in at least an upper side of the bearing hole with respect to a horizontal line is formed slightly larger than a diameter of the support shaft, and a space is provided between the inner surface of the upper side of the bearing hole and the support shaft.

A press molding apparatus according to an embodiment of a second invention is configured in a way that it has a lower mold having at least a rotational die and an upper mold facing the lower mold, and a pivot support shaft provided in the rotational die is rotatably supported in a bearing hole of a bearing provided in the lower mold, wherein an inner diameter in at least an upper side of the bearing hole with respect to a horizontal line is formed slightly larger than a diameter of the support shaft, and a space is provided between the inner surface of the upper side of the bearing hole and the support shaft.

In the press molding apparatus, an end of the rotational die in a vertical or horizontal direction from the support shaft is preferably situated slightly on a release direction side with respect to the vertical or horizontal direction from the support shaft.

The bearing structure according to the invention is the structure of the bearing for rotatably supporting the pivot support shaft of the rotational die arranged in the press molding apparatus in the bearing hole, which is configured in a way that the inner diameter in at least the upper side of the inner diameter of the bearing hole with respect to the horizontal line is formed slightly larger than the diameter of the support shaft, and the space is provided between the inner surface of the upper side of the bearing hole and the support shaft, and the press molding apparatus is configured in a way that it has the lower mold having at least the rotational die therein and the upper mold facing the lower die, and the pivot support shaft provided in the rotational die is rotatably supported in the bearing hole of the bearing provided in the lower mold, wherein the inner diameter of at least the upper side of the bearing hole with respect to the horizontal line is formed slightly larger than the diameter of the support shaft, and the space is provided between the inner surface of the upper side of the bearing hole and the support shaft. In this manner, excellent advantages are exhibited, that is, the rotational die and a predetermined position in the lower mold where the rotational die is to be provided can be set in the zero contact manner, so that the operation of setting the rotational die in the predetermined position in the lower mold can be easily performed, and occurrence of problems such as insufficient rotation of the rotational die and breakage of the support shaft is reduced.

In the press molding apparatus, the end of the rotational die in the vertical or horizontal direction from the support shaft is situated slightly on the release direction side with respect to the vertical or horizontal direction from the support shaft, and thereby an excellent advantage is exhibited, that is, occurrence of the problems such as insufficient rotation of the rotational die and breakage of the support shaft is further reduced.

DETAILED DESCRIPTION OF THE PREFERRED EMBODIMENTS

Next, the invention will be described in detail according to a specific embodiment.

Figure 1:
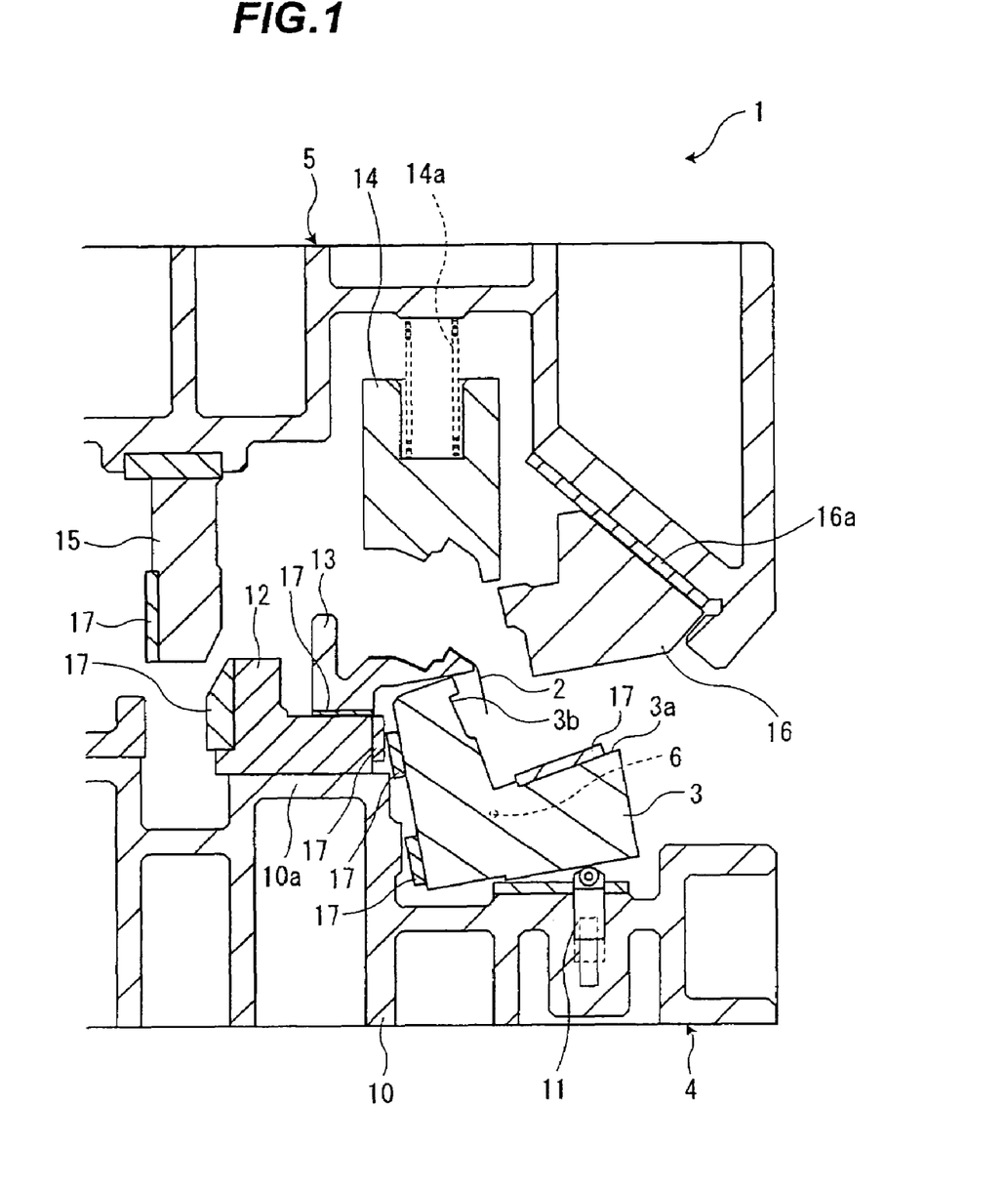
FIG. 1 is a cross section view of an internal structure of a press molding apparatus according to an embodiment of the invention, schematically showing a state before pressing of a sheet material as a workpiece.
Figure 2:
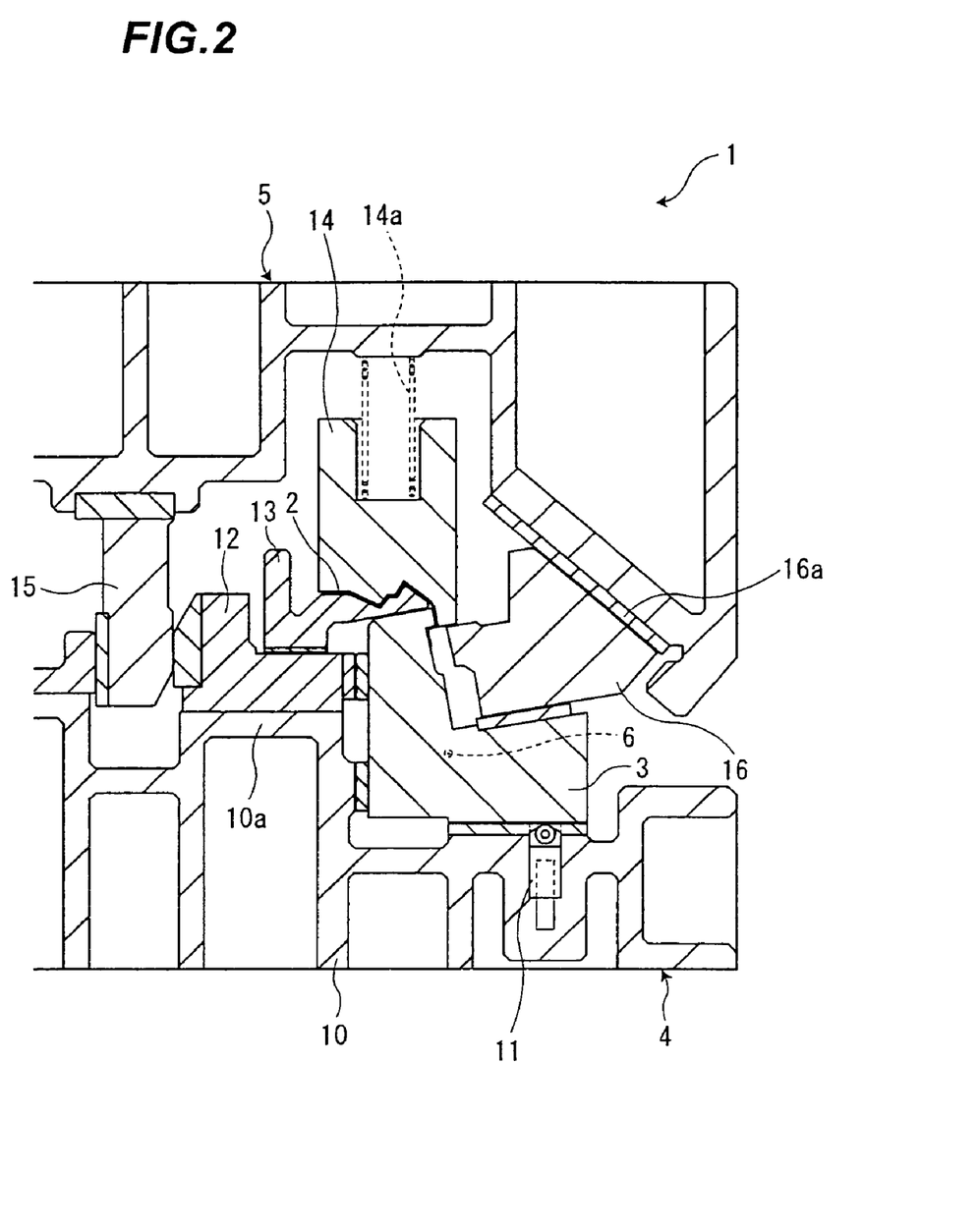
FIG. 2 is a cross section view schematically showing an internal structure of the press molding apparatus immediately after pressing the sheet material.
Figure 3:
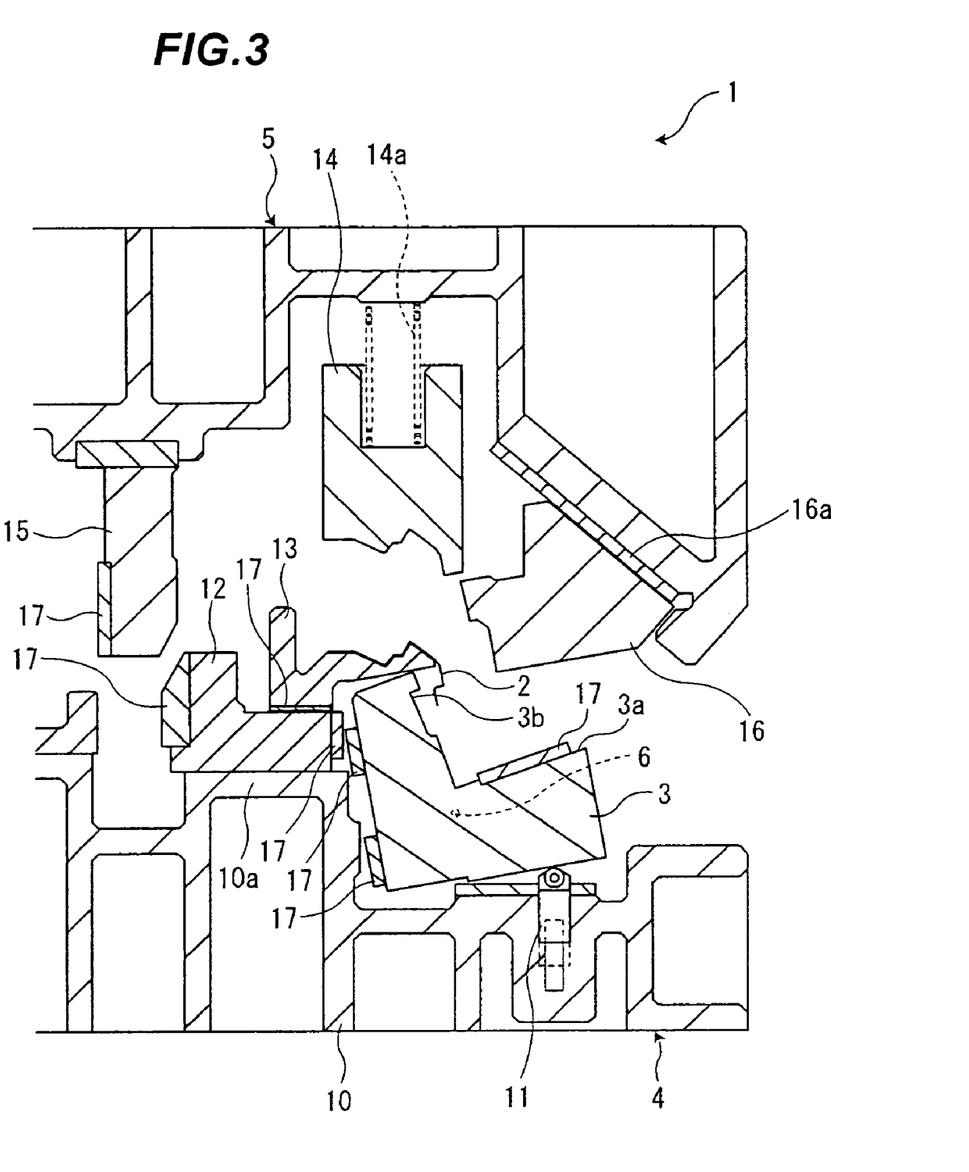
FIG. 3 is a cross section view schematically showing an internal structure of the press molding apparatus after pressing the sheet material.

A bearing structure according to the embodiment of the invention and a press molding apparatus having the bearing structure are described with reference to FIGS. 1 to 8. FIGS. 1 to 3 schematically show an internal structure of a press molding apparatus 1 in a cross section view. FIG. 1 shows a condition before performing pressing using a rotational die 3 of a sheet material 2 as a workpiece; FIG. 2 shows a condition immediately after pressing the sheet material 2 using the rotational die 3; and FIG. 3 shows a condition where the rotational die 3 is separated from the sheet material 2 after pressing. While the rotational die 3 is in an L-shape here, it may be in any other shape such as a cylindrical shape.

In the press molding apparatus 1, at least a lower mold 4 and an upper mold 5 are provided. In the lower mold 4, the rotational die 3 is arranged in a rotatable manner with a support shaft 6 as a center.

Figure 4:
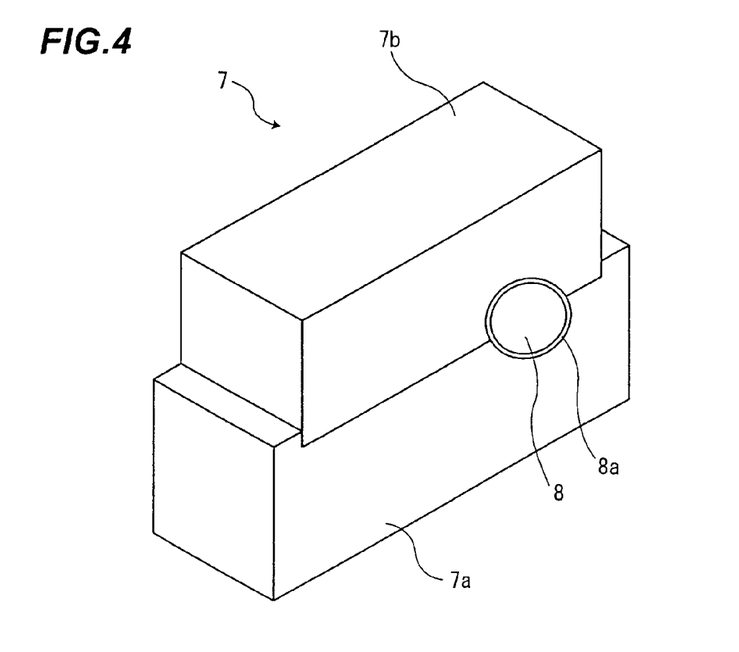
FIG. 4 is a perspective view schematically showing a bearing provided in a lower mold of the press molding apparatus.
Figure 5:
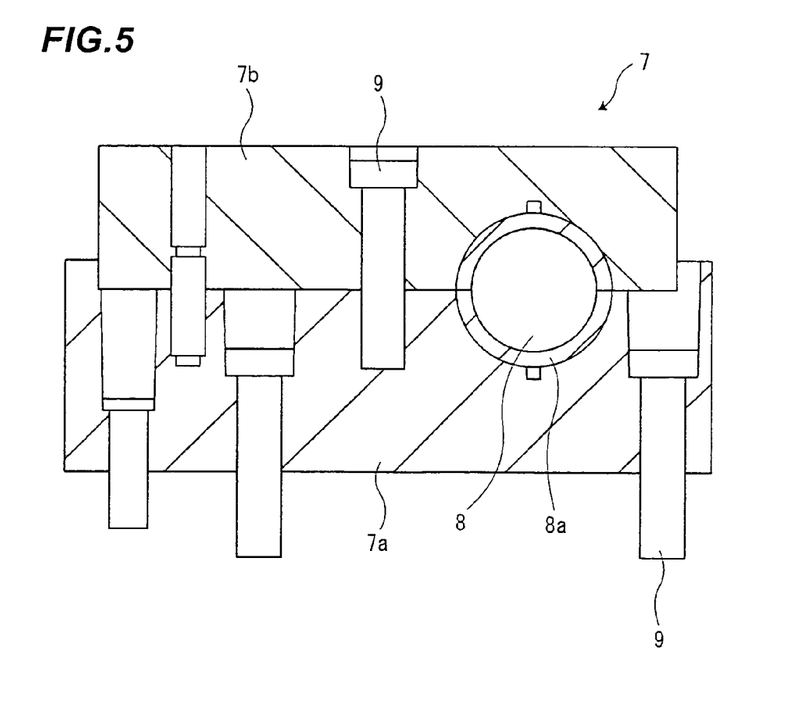
FIG. 5 is a cross section view schematically showing the bearing.

FIG. 4 schematically shows a bearing 7 provided in the rotational die 3 in a schematic view, the bearing being for rotatably pivoting the support shaft 6; and FIG. 5 shows a vertical section of the bearing. The bearing 7 is provided in a predetermined position in the lower mold 4. In the bearing 7, a bearing hole 8 for rotatably pivoting the support shaft 6 is formed.

A bearing 8a may be arranged in the bearing hole 8 so that the support shaft 6 can be rotated more easily. Moreover, to facilitate operation of inserting the support shaft 6 for assembling, the bearing 7 is preferably provided in a manner of being separated into a bearing body 7a situated at a lower side of the support shaft 6 for substantially pivoting the support shaft 6 when the support shaft 6 is inserted, and a bearing cover member 7b being situated at an upper side of the support shaft 6 to cover the upper side of the support shaft 6 and thus preventing falling off of the shaft and supplementarily pivoting the support shaft 6.

Generally, the inner diameter of the bearing hole 8 (or bearing 8a) and diameter of the support shaft 6 are preferably formed with high dimensional accuracy within $\frac{1}{100}$ mm to maintain accuracy in pressing. However, in the case of using the bearing 7 separated into the bearing body 7a and the bearing cover member 7b as described before, while the inner diameter of the bearing body 7a and the diameter of the support shaft 6 are preferably made with high dimensional accuracy within $\frac{1}{100}$ mm, the inner diameter of the bearing cover member 7b and the diameter of the support shaft 6 may be in a freely fitting condition in some degree if the member 7b can supplementarily pivot the upper side of the support shaft 6, because the bearing cover member 7b does not substantially pivot the support shaft 6 due to gravity.

Figure 6A:
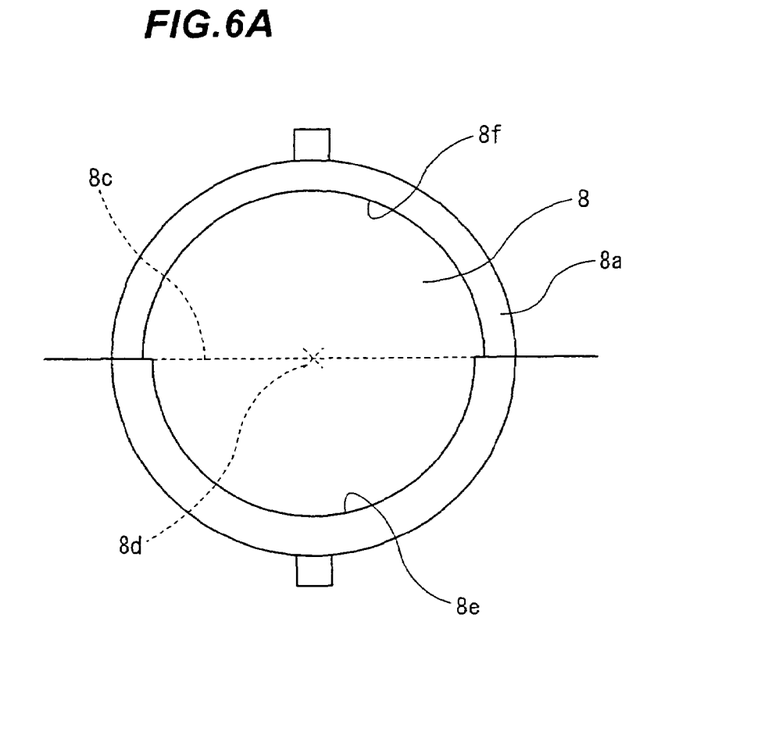
FIG. 6A is a front view schematically showing the periphery of a bearing hole as a relevant part of the bearing in an enlarged manner.

The bearing body 7a and the bearing cover member 7b are assembled by fastening them using bolts 9 or the like after the support shaft 6 has been inserted. In consideration of insertion of the support shaft 6, the bearing body 7a and the bearing cover member 7b are preferably separated at a horizontal line 8c passing through a center of the inner diameter of the bearing hole 8 formed at a side of the bearing body 7a, as shown in FIG. 6A showing the periphery of the bearing hole 8 in an enlarged manner. The reason for this is because when they are separated at an upper side or a lower side with respect to such a horizontal line 8c of the inner diameter of the bearing hole 8, the size of a bore formed by such separation becomes small compared with the length of the horizontal line 8c as the diameter of the inner diameter of the bearing hole 8 to be the maximum length, and consequently it becomes small compared with the diameter of the support shaft 6, and therefore the support shaft 6 can not be smoothly inserted. The horizontal line 8c passing through the center of the inner diameter of the bearing hole 8 formed at the side of the bearing body 7a is an imaginary line passing through a substantially central portion 8d of the bearing hole 8 (position corresponding to a central portion of the support shaft 6 when the support shaft 6 is inserted), and being in a direction perpendicular (horizontal direction) to a gravity direction (vertical direction) applied to the support shaft 6 to be inserted.

The inner diameter of the bearing body 7a separated by the horizontal line 8c passing through the center of the inner diameter of the bearing hole 8 formed at the side of the bearing body 7a, that is, the inner diameter of a lower-side bearing hole 8e in a lower side of the bearing 7 is formed in a semicircular shape to have a diameter with high dimensional accuracy within 0 mm to +1/100 mm compared with the diameter of the support shaft 6. On the other hand, the inner diameter of the bearing cover member 7b, that is, the inner diameter of an upper-side bearing hole 8f in an upper side of the bearing 7 is formed in a semicircular shape having a diameter slightly larger than the diameter of the support shaft 6, and preferably having a diameter approximately 0.2 mm larger than the diameter of the support shaft 6 irrespective of the size of the support shaft 6. Thus, the inner diameter of the upper-side bearing hole 8e is slightly larger than the inner diameter of the lower-side bearing hole 8f.

In a word, the upper-side bearing hole 8f formed in the bearing cover member 7b can supplementarily pivot the support shaft 6 by covering the upper side of the support shaft 6 in a slightly freely-fitting-condition in a degree that the support shaft 6 does not fall off, and work accuracy is not inhibited during pressing. When the upper-side bearing hole 8f has an extremely large diameter compared with the diameter of the support shaft 6, working accuracy of the hole is inhibited during pressing. However, when the hole is formed to have a diameter approximately 0.2 mm large compared with the diameter of the support shaft 6, working accuracy of the hole is not inhibited during pressing. An inner shape of the hole is not limited to the semicircular shape, and for example, may be an elliptical shape.

The inner diameter in the upper side of the bearing hole 8 with respect to the horizontal line, that is, the inner diameter of the upper-side bearing hole 8f is formed slightly larger than the diameter of the support shaft 6 in this way, such that a space can be provided between the inner diameter in the upper side of the bearing hole 8 and the support shaft 6. Therefore, the operation of setting the rotational die 3 in the predetermined position in the lower mold 4, that is, the operation of inserting the support shaft 6 into the bearing hole 8 of the bearing 7 for assembling can be easily performed.

The bearing 7 may be singly provided in part of the lower mold 4, or may be formed in a cavity 10 of the lower mold 4. The bearing hole 8 need not be necessarily separated into the upper side and the lower side with respect to the horizontal line 8c of the inner diameter, and the upper side and the lower side may be integrally formed if a shape of the inner diameter is made in a manner that the upper side is formed to have a diameter slightly large compared with the diameter of the support shaft 6, and the lower side is formed to have approximately the same diameter as the diameter of the support shaft 6 with the horizontal line 8C as a border.

A lift pin 11 is arranged in the cavity 10 at a lower side (bottom side) of the rotational die 3 in the lower mold 4, as shown in FIGS. 1 to 3, which can project or retract by vertically sliding. When the lift pin 11 projects from the cavity 10 by vertically sliding, it can rotate the rotational die 3 by pressing the bottom of the rotational die 3.

A pressing cam 12, which is slidable in a left and right direction in the figure, is arranged at a backside of the rotational die 3 in the lower mold 4. The pressing cam 12 is slidable in a space between an upper side 10a of the cavity 10 at the backside of the rotational die 3 and a sheet material receiver 13 on which the sheet material 2 is set during pressing. For example, in the case of setting a partially processed sheet material 2, the sheet material receiver 13 is formed in accordance with a processed shape of the sheet material 2 such that it follows the shape.

On the other hand, the upper mold 5 facing the lower mold 4 is provided above the lower mold 4, and the whole body of the mold 5 is moved in a vertical direction. That is, when the sheet material 2 as a workpiece is set on the sheet material receiver 13 of the lower mold 4 (refer to FIG. 1), the upper mold 5 is held thereabove, and after the sheet material 2 has been set on the sheet material receiver 13, the upper mold 5 is lowered for pressing (refer to FIG. 2).

An upper pad 14 for pressing an upper part of the sheet material 2 set on the sheet material receiver 13 is arranged in the upper mold 5, the pad being formed in accordance with the shape of the sheet material 2. The upper part of the sheet material 2 set on the sheet material receiver 13 is pressed by the upper pad 14, and thereby the sheet material 2 can be fixed such that the sheet material 2 is not displaced during pressing of the sheet material 2. A cushion spring 14a is provided between the upper pad 14 and the upper mold 5, and the upper part of the sheet material 2 can be fixed by being pressed at an appropriate pressing force by the cushion spring 14a.

A doweling 15 is further arranged in the upper mold 5 in a downward projecting manner such that when the upper mold 5 is lowered, the doweling is lowered toward a backside of the pressing cam 12 arranged in the lower mold 4, that is, toward a left side of the pressing cam 12 in the figure. When the upper mold 5 is held in its raised position, the doweling 15 is not contacted to the backside of the pressing cam 12; however, when the upper mold 5 is lowered, it is contacted to the backside of the pressing cam 12, and presses the backside of the pressing cam 12, thereby sliding the pressing cam 12 to a position near the rotational die 3 and holding the cam at such position.

That is, while pressing is not done, or while the upper mold 5 is kept in the raised position, as shown in FIG. 1, the pressing cam 12 is pushed rearward from the rotational die 3 by the die 3 being rotated by the lift pin 11 projecting upward, to thereby slide in a leftward direction in the figure. When the upper mold 5 is lowered, as shown in FIG. 2, the pressing cam 12 is pressed by the doweling 15 and thus slides in a rightward direction in the figure, and is kept at a certain position in a condition that the rotational die 3 is pushed and thereby rotated at a predetermined angle.

A slide cam 16 for molding is arranged in the right of the upper pad 14 of the upper mold 5, which is for pressing a working portion of the sheet material 2 fixed on the sheet material receiver 13 by the upper pad 14, and pressing the sheet material 2 into an intended shape between the slide cam 16 and the rotational die 3.

The slide cam 16 is arranged in a slidable manner on a sliding area 16a provided in the upper mold 5. The sliding area 16a is provided in an oblique manner, and when the upper mold 5 is lowering and thus a lower part of the slide cum 16 is contacted to a sliding surface 3a of the rotational die 3, then the upper mold 5 is further lowering, the slide cam slides obliquely upward (in an upper leftward direction in the figure) along the sliding area 16a. That is, since the height of the sliding surface 3a of the rotational die 3 is fixed, the slide cam 16 slides in a substantially leftward direction in the figure to press the working portion of the sheet material 2, so that pressing can be carried out.

Next, steps for the press molding apparatus 1 to perform pressing of the sheet material 2 are sequentially described. First, while the upper mold 5 is kept in an upper position, the sheet material 2 is set on the sheet material receiver 13 in the lower mold 4 (refer to FIG. 1). Such operation of setting the sheet material 2 on the sheet material receiver 13 may be performed by using a predetermined device such as a conveyer, or may be manually performed.

When the upper mold 5 is raised, the slide cam 16 arranged in the upper mold 5 slides obliquely downward (in a lower right direction in the figure) to a predetermined position along the sliding area 16a due to its own weight.

The lift pin 11 provided in the lower mold 4 slides upward and projects from the cavity 10, and presses a bottom near a front of the rotational die 3, and thereby the rotational die 3 is rotated counterclockwise in the figure. The rotational die 3 is rotated, and thereby a molding part 3b of the rotational die 3 is separated from the sheet material 2 set on the sheet material receiver 13, or rotated in the left direction in the figure, that is, rotated to a side in a release direction as a backside direction of the rotational die 3. Thus, the sheet material 2 can be easily set.

When the rotational die 3 is rotated by pressing force by the upward projected lift pin 11, the pressing cam 12 is pushed by the back of the rotational die 3 and thus slides in the leftward direction in the figure.

When the upper mold 5 is started to be lowered, the lift pin 11 slides downward along with lowering of the upper mold 5 so as to be retracted into the cavity 10. When the lift pin 11 is retracted into the cavity 10, the rotational die 3 is rotated clockwise in the figure along with retraction of the lift pin 11. That is, the rotational die 3 is rotated toward a fixing direction side with the support shaft 6 as a center due to its own weight. The bottom of the rotational die 3 is contacted to the cavity 10, and thereby rotation of the rotational die 3 is stopped, and such a condition is maintained.

Figure 6B:
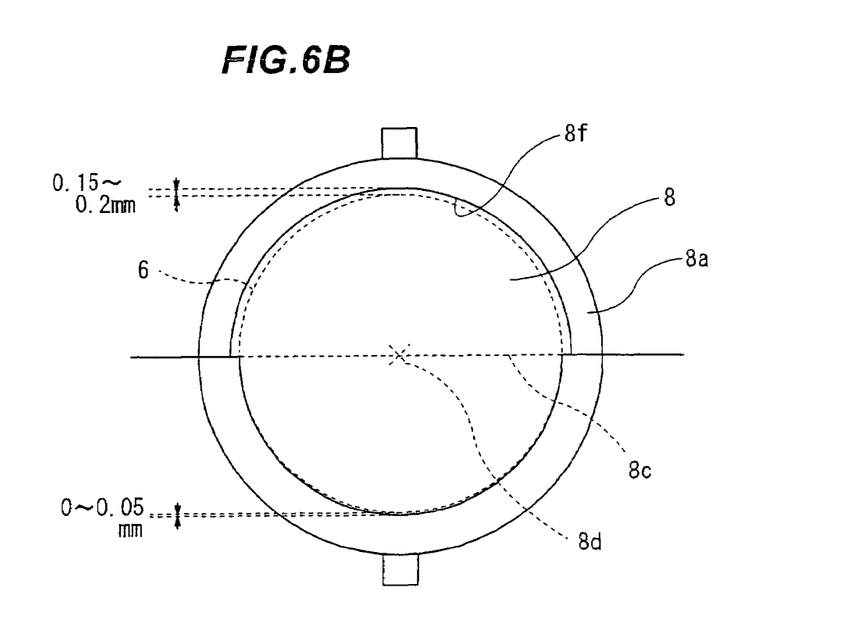
FIG. 6B is a front view illustrating a condition that a support shaft is inserted into the bearing hole.
Figure 7:
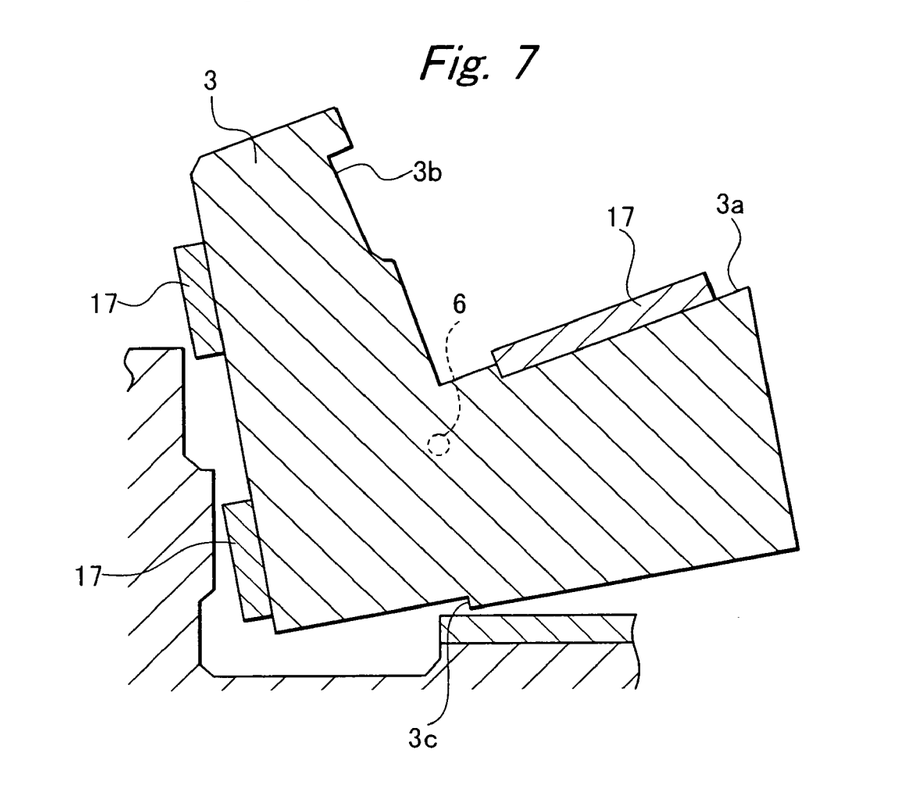
FIG. 7 is cross section view schematically showing a rotational die provided in the lower mold of the press molding apparatus in an enlarged manner.

When the bottom of the rotational die 3 is contacted to the cavity 10, in the case that an axis of the support shaft 6 is situated slightly high compared with an axis of the bearing hole 8, if the support shaft 6 and the bearing hole 8 are formed to be approximately the same size as in the related art, before the whole bottom of the rotational die 3 is contacted to the cavity 10, part of the bottom of the rotational die 3, that is, a bottom contact end 3c is contacted to the cavity 10, and thereby rotation of the rotational die 3 is inhibited, causing problems such as insufficient rotation of the rotational die 3 and breakage of the support shaft 6. With a structure of the bearing 7 according to the invention, the inner diameter of the upper side of the bearing hole 8 with respect to the horizontal line 8c passing through the center of the inner diameter, the upper side being formed in the bearing body 7a side, is formed slightly larger than diameter of the support shaft 6, and thus a space is provided between the inner diameter of the upper side of the bearing hole 8 and the support shaft 6, and therefore, even if the bottom contact end 3c of the rotational die 3 is contacted to the cavity 10 before the whole bottom of the rotational die 3 is contacted to the cavity 10, the support shaft 6 is in a slightly floating condition in the bearing hole 8 as shown in FIG. 6B. Therefore, rotation of the rotational die 3 is not inhibited, and consequently problems such as insufficient rotation of the rotational die 3 and breakage of the support shaft 6 can be reduced.

In this way, the inner diameter of the upper side of the bearing hole 8 with respect to the horizontal line 8c passing through the center of the inner diameter, the upper side being formed in the bearing body 7a side, is formed slightly larger than the diameter of the support shaft 6. Thus, a space is provided between the inner diameter of the upper side of the bearing hole 8 and the support shaft 6, and thereby the axis of the support shaft 6 is movable to a position slightly higher than a central position of the bearing hole 8, and thereby the rotational die 3 and the predetermined position in the lower mold 4 where the rotational die 3 is to be provided can be securely set in a zero contact manner, and problems such as insufficient rotation of the rotational die 3 and breakage of the support shaft 6 can be reduced.

Incidentally, a space between the inner diameter of the bearing hole 8 in a condition that the support shaft 6 is slightly floating in the bearing hole 8 and the support shaft 6 at the lower side of the bearing hole 8, that is, a space between the lower-side bearing hole 8e and the support shaft 6 may be about 0 mm to 0.05 mm, and the space at the upper side of the bearing hole 8 in the condition, that is, a space between the upper-side bearing hole 8f and the support shaft 6 can be about 0.15 mm to 0.2 mm.

Figure 8:
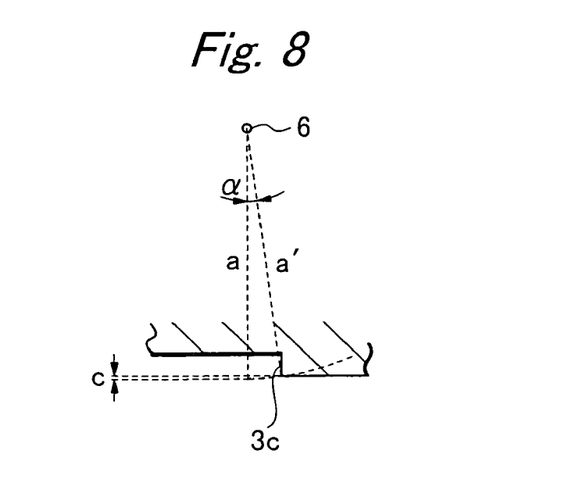
FIG. 8 is an explanatory view showing a positional relationship between the support shaft of the rotational die and a bottom end of the rotational die.

Furthermore, in a view of a positional relationship between the support shaft 6 and the bottom end 3c of the rotational die 3, as shown in FIG. 8, the bottom end 3c is formed to be situated at a slightly release direction side with respect to a position at which the bottom of the rotational die 3 intersects orthogonally with a perpendicular from the center of the support shaft 6 to the bottom, that is, situated at a counterclockwise side of the perpendicular in the figure. The bottom end 3c is formed in this way, thereby when the rotational die 3 is rotated in the release (counterclockwise) direction, compared with a case of forming the end 3c at the position at which the bottom of the rotational die 3 intersects orthogonally with the perpendicular to the bottom, a space is produced between the bottom contact end 3c of the rotational die 3 and the lower mold 4 and thus contact resistance between them is reduced, consequently occurrence of problems such as insufficient rotation of the rotational die 3 and breakage of the support shaft 6 is further reduced. This is because the bottom contact end 3c is situated at a position of a line (imaginary line a') as a result of counterclockwise rotation of a line (imaginary line a) from the center of the support shaft 6 to an extension of the bottom of the rotational die 3 by a predetermined angle $\alpha$, and consequently rotation radius with the support shaft 6 as a center can be decreased by c as shown in FIG. 8.

Furthermore, since the doweling 15 provided in the upper mold 5 is lowered along with lowering of the upper mold 5, the doweling 15 is contacted to the backside of the pressing cam 12 and presses the cam. Thereby, as shown in FIG. 2, the pressing cam 12 is slid to a position near the rotational die 3, or in the rightward direction in the figure, and is fixed and held at the position. That is, since a position of the pressing cam 12 is maintained while the pressing cam 12 is contacted to the backside of the rotational die 3, the rotational die 3 is held in the position without moving or rotating in a backside direction.

Furthermore, the upper pad 14 provided in the upper mold 5 presses an upper part of the sheet material 2 set on the sheet material receiver 13, and fixes it so as not to be displaced. When the upper mold 5 is further lowered from this condition, the slide cam 16 arranged in the sliding area 16a slides in the leftward direction in the figure and thus presses the working portion of the sheet material 2, so that pressing is carried out. In this way, since the rotational die 3 whose posture is fixed by the pressing cam 12 is used, and pressing is carried out on the sheet material 2 securely fixed by the sheet material receiver 13 and the upper pad 14, accuracy of products manufactured by the pressing is improved.

When the pressing of the sheet material 2 has been finished, as shown in FIG. 3, the upper mold 5 is raised, and the lift pin 11 slides upward and projects from the cavity 10, and thereby presses the bottom near the front of the rotational die 3. Thus, the rotational die 3 is rotated in the release direction, that is, rotated counterclockwise in the figure. Consequently, the sheet material 2 set on the sheet material receiver 13 can be easily removed, even if it is subjected to negative-angle molding.

Patches 17 are provided on a contact surface between the rotational die 3 and the cavity 10, a contact surface between the rotational die 3 and the pressing cam 12, a contact surface between the rotational die 3 and the slide cam 16, a contact surface between the pressing cam 12 and the sheet material receiver 13, and a contact surface between the pressing cam 12 and the doweling 15, respectively, so that contact resistance between them is reduced.

In consideration of maintaining accuracy of products manufactured by pressing, only the inner diameter of the upper side of the bearing hole 8 with respect to the horizontal line is formed slightly larger than the diameter of the support shaft 6 in the embodiment. However, when accuracy of products manufactured by pressing is not required, the whole inner diameter of the bearing hole 8 may be formed slightly larger than the diameter of the support shaft 6. When the whole inner diameter of the bearing hole 8 is formed slightly larger than the diameter of the support shaft 6, even if a position where the support shaft 6 is provided is in a position in a slightly low direction compared with a position where the center of the bearing hole 8 is provided, the rotational die 3 and the predetermined position in the lower mold 4 in which the rotational die 3 is provided are set in the zero contact manner.

INDUSTRIAL APPLICABILITY

The structure of the bearing according to the invention and the press molding apparatus having such a bearing structure facilitate insert on the support shaft into the bearing hole formed in the bearing and setting of the rotational die in the predetermined position in the lower mold, and allow reduction in problems such as insufficient rotation of the rotational die and breakage of the support shaft, and consequently contribute to improvement in manufacturing efficiency and quality of pressing products.

What is claimed is:

1. A bearing structure for rotatably supporting, in a bearing hole, a pivot support shaft of a rotational die arranged in a press molding apparatus, wherein
    an inner diameter of at least an upper side of the bearing hole with respect to a horizontal line passing through a center of the bearing hole is formed slightly larger than a diameter of the support shaft, and
    a space is provided between the support shaft and an inner surface of the upper side of the bearing hole.

2. A press molding apparatus having a lower mold having at least a rotational die therein, and an upper mold facing the lower mold,
    in which a pivot support shaft provided in the rotational die is rotatably supported in a bearing hole of a bearing provided in the lower mold, wherein
    an inner diameter of at least an upper side of the bearing hole with respect to a horizontal line passing through a center of the bearing hole is formed slightly larger than a diameter of the support shaft, and
    a space is provided between the support shaft and a thinner surface of the upper side of the bearing hole.

3. The press molding apparatus according to claim 2, wherein one end of a bottom of the rotational die is situated slightly on a release direction side of a position at which the bottom intersects orthogonally with a perpendicular extending from a center of the support shaft to the bottom.

4. A bearing structure for rotatably supporting a pivot support shaft of a rotational die of a press molding apparatus, said bearing structure comprising:
    an upper bearing part having an upper bearing surface defining an upper side of a bearing hole;
    a lower bearing part having a lower bearing surface defining a lower side of the bearing hole;
    wherein said upper side of said bearing hole faces said lower side of said bearing hole across a horizontal line passing through a center of said bearing hole;
    wherein an inner diameter of said upper side of said bearing hole is formed slightly larger than an inner diameter of said lower side of said bearing hole, such that when said lower side of said bearing hole supports a pivot support shaft having an outer diameter generally corresponding to said inner diameter of said lower side of said bearing hole, a space is provided between the pivot support shaft and said inner surface of said upper side of said bearing hole.

* * * * *